July 15, 1947.  T. HINDMARCH  2,423,886
POWER TRANSMISSION MECHANISM
Filed Feb. 7, 1944  2 Sheets-Sheet 1

Inventor
T. Hindmarch
By Hascock Downing & Seebold
Attys

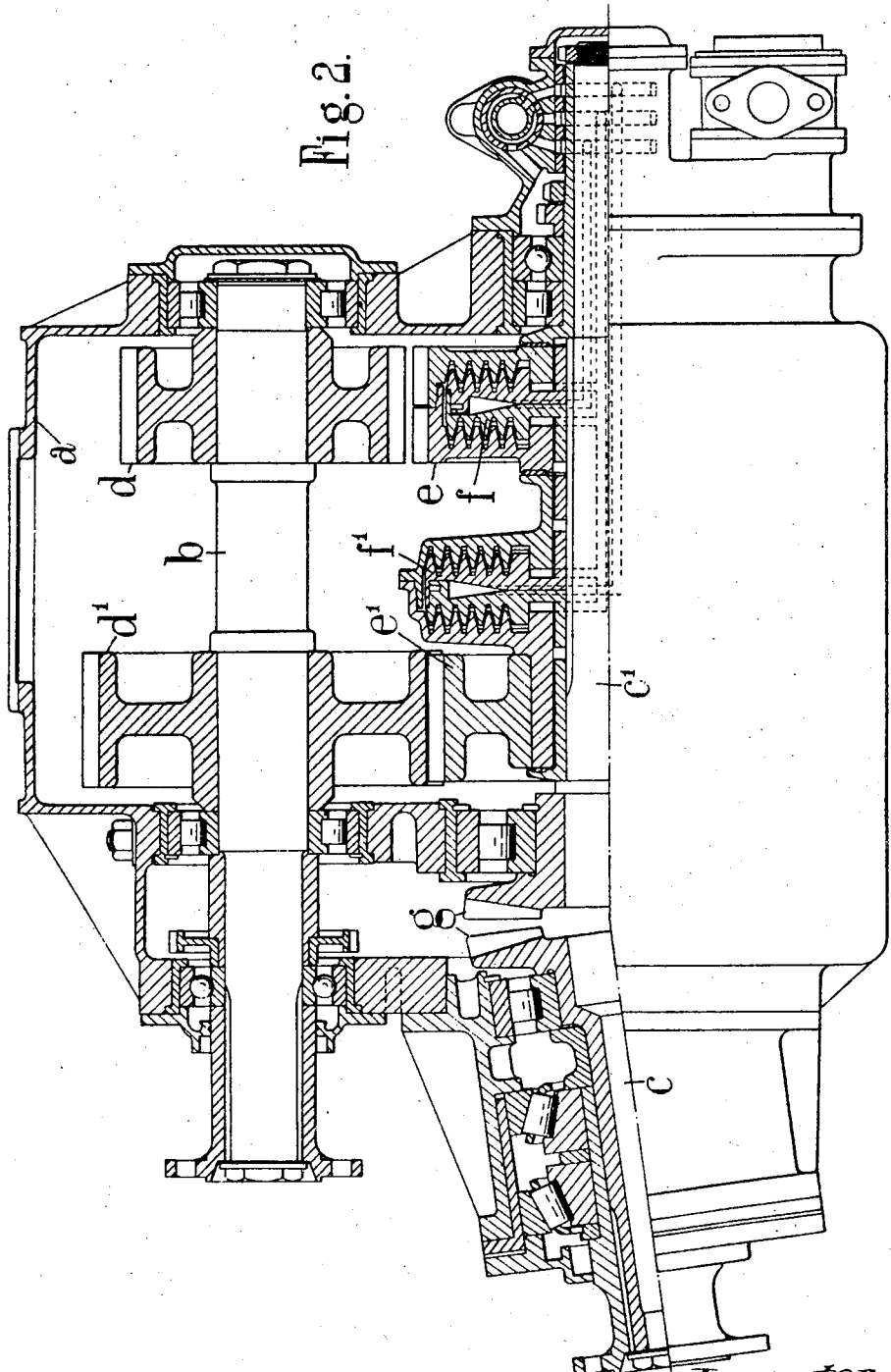

Patented July 15, 1947

2,423,886

UNITED STATES PATENT OFFICE 2,423,886

POWER TRANSMISSION MECHANISM

Thomas Hindmarch, London, England

Application February 7, 1944, Serial No. 521,411
In Great Britain February 19, 1943

2 Claims. (Cl. 74—378)

This invention relates to power transmission mechanism and has for its principal object to provide a compact arrangement of mechanism such as will be particularly suitable for the propulsion of ships or boats or in other situations where economy of space may be an important consideration.

The invention consists in power transmission mechanism comprising a gear-box housing with one or more input shafts on the same or opposite sides of the gear-box and adapted for connection to one or more engines or other prime movers and one or more output shafts on the same or opposite sides for driving a propeller or other device, a pair of driving gear wheels on the input shaft which mesh either directly or indirectly with a pair of gear wheels on the output shaft in such a way that one gear on the output shaft or shafts has the opposite hand of rotation to the other gear and pressure oil operated couplings or the like means for selecting the particular direction of drive or a neutral position. I may also provide for more than one pair of driving and/or intermediate gear wheels and/or more than one pair of oil operated clutches so that more than one ratio can be obtained in either direction of rotation of the output shaft.

The invention also consists in power transmission mechanism according to the preceding paragraph, in which the gears are in the form of bevels or any other form of gear wheels such that the input and output shafts may take any desired position and/or angle relative to one another, the pressure oil operated clutches being integral or part of or located on either the input-output or any intermediate shaft as may be desired. In one extreme case the output shaft or shafts could be co-axial with the input shaft or shafts.

The invention also consists in power transmission mechanism according to the preceding paragraph in which the couplings for the ahead and/or astern running are arranged within the appropriate gear wheels or one or the other or both couplings are outside the gear wheels, but secured to its corresponding gear wheel.

The invention also consists of a power transmission mechanism according to the preceding paragraphs in which the bearing arrangement on the output shaft is a combination of bearings capable of taking any externally imposed axial thrust load which may for instance be created by a rotating propeller, in addition to the nominal bearing loads inherent in any power transmission, and created by the meshing gear wheels.

The invention also consists of a power transmission mechanism according to the preceding paragraph in which one or more oil operated clutches are situated on any of the shafts or a combination of oil operated clutches situated on different shafts, their operation being controlled by a single or a combination of levers and valves or the like mechanism.

The accompanying drawings illustrate several modes of carrying out the invention.

Figure 2 is a similar view showing a modified form of transmission.

Figure 1:
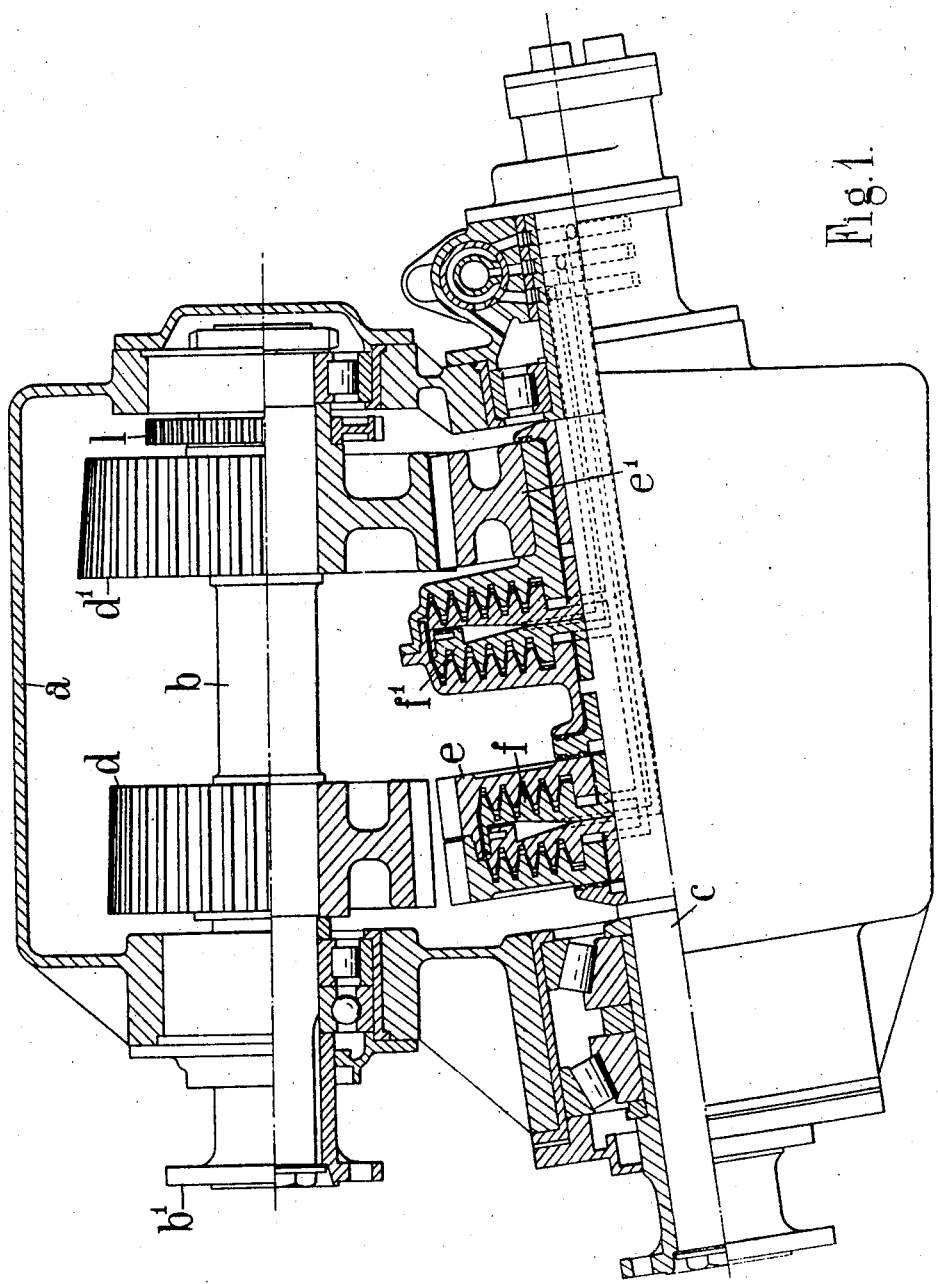
Figure 1 is a part longitudinal sectional elevation of one form of transmission in accordance with the invention.

In carrying my invention into effect in one convenient manner as for example in its application to the propulsion of a boat and as illustrated in Figure 1, I form my improved gear with a gear-box $a$ in which I house an input shaft $b$ adapted to be connected at $b'$ to the engine or other prime mover (not shown) either directly or indirectly through gearing and an output shaft $c$ adapted to drive the propeller, the shafts and their interconnecting gearing being preferably so arranged that the propeller will be on the same side of the gear as the prime mover while the shafts will also be inclined relatively to one another.

In the particuar construction shown in Figure 1 I arrange upon the input shaft two bevel wheels $dd'$, one of which $d'$ is adapted to engage directly with a corresponding bevel wheel $e'$ upon the output shaft for "ahead" running while the other bevel wheel $d$ is adapted to engage indirectly through an idler with its corresponding gear $e$ upon the output shaft for "astern" running and either the "ahead" or the "astern" or both gears may embody any desired ratios.

For the purpose of selecting the ahead and astern drives and for providing a neutral position I arrange in connection with the gears $ee'$ which are loose upon the output shaft oil-operated control couplings $ff'$ which may, for example, be constructed and arranged generally in the manner described and claimed in the specification of British Patent No. 382,865 or 438,563. It will of course be understood that in place of the above arrangement the oil-operated control couplings may be associated with the gears on the input shaft, in which case such gears will be loose upon the shaft while the gears on the output shaft will be fast thereon. In cases where it is desirable to arrange for the axes of the input and output shafts to be spaced as closely together as possible I arrange the astern clutch or coupling to be disposed inside its corresponding gear wheel e upon the output shaft, while the coupling f' for the ahead drive is situated outside its corresponding gear wheel e' but is attached thereto.

Figure 2 shows a slightly modified form of gearing from that shown in Figure 1 in that in the arrangement shown in Figure 2 the output shaft is in effect formed in two parts c c', the part c' which may be looked upon as an intermediate shaft being parallel with the output shaft while the part c is connected thereto by bevel gears g so as to provide for the angular relationship between the input and output shafts while permitting of spur gears in place of bevel gears. In all other respects the gear is practically identical with that shown in Figure 1 and as like parts in the two figures are indicated by like reference letters it is not thought that any further description will be necessary.

To the input or any other shaft and/or gear wheel which is in motion as soon as the input shaft coupling rotates is connected and driven (for example by the spur wheel l in Figure 1) one or more oil pumps (not shown) which supply pressure oil for the oil-operated couplings and/or maintain the desired oil level and oil circulation required for operating the gear box and I may also, if desired, provide one or more oil pumps which draw the oil from the gear box casing and deliver into the high pressure oil system of the gear box connected and driven from the output shaft or shafts or driven independently to provide the pressure oil required when the output shaft is driven by for instance, a trailing propeller.

It will be understood that the invention is not to be limited to the foregoing details of construction which are given by way of example only as I may modify the relative arrangement of the input and output shafts and the nature of the gearing coupling the same depending upon the purpose for which the power transmission mechanism is to be employed or any practical requirements that may have to be fulfilled.

I claim:
1. A power transmission mechanism comprising in combination a gear box housing, an input shaft and an output shaft therein relatively inclined to one another, a pair of gear wheels on the said shafts directly meshing with one another for driving in a forward direction, a second pair of gear wheels on said shafts meshing with one another indirectly through an idler for reverse running and fluid pressure operated couplings for selecting the particular gear to be used, the coupling for the reverse running being situated inside one of its associated gear wheels while the coupling for forward running is located between the first and second mentioned pairs of wheels.

2. A power transmission mechanism according to claim 1 in which the shafts are inclined to one another throughout the whole of their length and the directly and indirectly meshing gears upon the input and output shafts are in the form of bevel gears.

THOMAS HINDMARCH.

REFERENCES CITED

The following references are of record in the file of this patent:

UNITED STATES PATENTS

| Number | Name | Date |
| --- | --- | --- |
| 1,731,076 | Maurer | Oct. 8, 1929 |
| 1,748,827 | Boltshauser | Feb. 25, 1930 |
| 1,772,158 | Prigg | Aug. 5, 1930 |
| 1,814,635 | Schlundt | July 14, 1931 |
| 2,128,930 | Fageol | Sept. 6, 1938 |
| 2,161,702 | Durig | June 6, 1939 |

FOREIGN PATENTS

| Number | Country | Date |
| --- | --- | --- |
| 540,718 | Great Britain | Oct. 27, 1941 |
| 382,865 | Great Britain | |
| 438,563 | Great Britain | |